United States Patent
Glencross

(10) Patent No.: US 7,575,156 B2
(45) Date of Patent: Aug. 18, 2009

(54) CONDUCTING FINANCIAL TRANSACTIONS UNDER MULTIPLE PROTOCOLS IN A SINGLE USER SESSION WITHIN A SELF-SERVICE TERMINAL

(75) Inventor: Stephen Glencross, Dunfermline (GB)

(73) Assignee: NCR Corporation, Dayton, OH (US)

( * ) Notice: Subject to any disclaimer, the term of this patent is extended or adjusted under 35 U.S.C. 154(b) by 289 days.

(21) Appl. No.: 11/642,094

(22) Filed: Dec. 20, 2006

(65) Prior Publication Data
US 2008/0154620 A1 Jun. 26, 2008

(51) Int. Cl.
*G06Q 40/00* (2006.01)

(52) U.S. Cl. ............... 235/379; 705/1; 705/35; 709/209

(58) Field of Classification Search ....... 235/375–382.5
See application file for complete search history.

(56) References Cited

U.S. PATENT DOCUMENTS

| | | | |
|---|---|---|---|
| 6,381,626 B1 * | 4/2002 | De Leo et al. | 235/379 |
| 6,405,317 B1 * | 6/2002 | Flenley et al. | 705/68 |
| 6,959,865 B2 * | 11/2005 | Walczyk et al. | 235/454 |
| 2002/0004781 A1 * | 1/2002 | Forsyth | 705/39 |
| 2002/0147684 A1 * | 10/2002 | Kirkhope et al. | 705/43 |
| 2003/0066876 A1 * | 4/2003 | Goldman et al. | 235/379 |
| 2003/0120597 A1 * | 6/2003 | Drummond et al. | 705/43 |
| 2004/0205491 A1 | 10/2004 | Korala et al. | |
| 2005/0086600 A1 | 4/2005 | Black et al. | |

FOREIGN PATENT DOCUMENTS

| | | |
|---|---|---|
| EP | 0 961 247 A2 | 12/1999 |
| GB | 2 319 102 A | 5/1998 |

* cited by examiner

*Primary Examiner*—Seung H Lee
*Assistant Examiner*—Christle I Marshall
(74) *Attorney, Agent, or Firm*—Priest & Goldstein PLLC

(57) ABSTRACT

A self-service terminal (SST) that allows a user to conduct one or more transactions through a remote transaction host during a user session includes a display module for use in presenting information to the user and a processing module that is configured to cause the SST to progress through a series of states. For each of the states, the SST receives from the transaction host an instruction to present on the display module a screen containing information corresponding to the state. At some point during the user session, the SST halts its progression through the series of states and presents on the display module a series of screens containing information received from a source other than the transaction host.

12 Claims, 4 Drawing Sheets

CONDUCTING FINANCIAL TRANSACTIONS UNDER MULTIPLE PROTOCOLS IN A SINGLE USER SESSION WITHIN A SELF-SERVICE TERMINAL

BACKGROUND

Self-service financial transactions, such as banking transactions conducted on automated teller machines (ATMs), typically take place on two types of machines, or self-service terminals (SSTs). The first of these machines follows a traditional "host-driven" approach to self-service transactions, in which the interaction between a user of the SST and the application software in the SST is driven by a transaction host in a financial-transaction network. In the host-driven approach, the SST leads the user through a prescribed series of transaction states, each having a corresponding video display screen that is delivered to the SST by the transaction host. The host-driven approach is a simple and popular approach that is used in the majority of ATMs worldwide. In the ATM industry, an industry standard known as "NDC" (the "states-and-screens" standard) has developed for ATM application software that uses this host-driven protocol.

The second approach to self-service transactions—the "client-driven" approach"—involves the use of standard browser-based application software in the SST to drive interaction with the user. With this approach, the SST application software accesses the transaction host as necessary for authorization and fulfillment of financial transactions conducted by the user, but the SST application software itself, and not the transaction host, drives the SST's operation. The result is that SSTs following the client-driven approach provide more flexibility for SST owners, giving them greater control of both the content presented to the users of the SSTs and the overall flow of self-service transactions taking place on the SSTs. The client-driven approach also allows the SST to access web-based services, such Internet services or customer-relationship management (CRM) applications located on network servers, while a user is engaged with the SST.

Despite all of the advantages of client-driven SSTs, however, owners of host-driven SSTs are reluctant to move wholesale to client-driven systems. Up to now, doing so would require the SST owners to replace all of their host-driven SSTs with client-driven SSTs, incurring tremendous cost along the way.

SUMMARY

Described below is a self-service terminal (SST) that allows a user to conduct one or more transactions through a remote transaction host during a user session. The SST includes a display module for use in presenting information to the user and a processing module that is configured to cause the SST to progress through a series of states. For each of the states, the SST receives from the transaction host an instruction to present on the display module a screen containing information corresponding to the state. At some point during the user session, the SST halts its progression through the series of states and presents on the display module a series of screens containing information received from a source other than the transaction host.

Also described is an SST that includes a data-storage module storing first and second self-service application modules and a processing module configured to execute the first and second self-service application modules during the user session. When the processing module is executing the first self-service application module, the SST is configured to receive instructions from the transaction host prescribing a flow for the user session in the SST. When the processing module is executing the second self-service application module, the SST is configured to receive no instructions from the transaction host prescribing a flow for the user session in the SST.

Other features and advantages will become apparent from the description and claims that follow.

DETAILED DESCRIPTION

Figure 1:
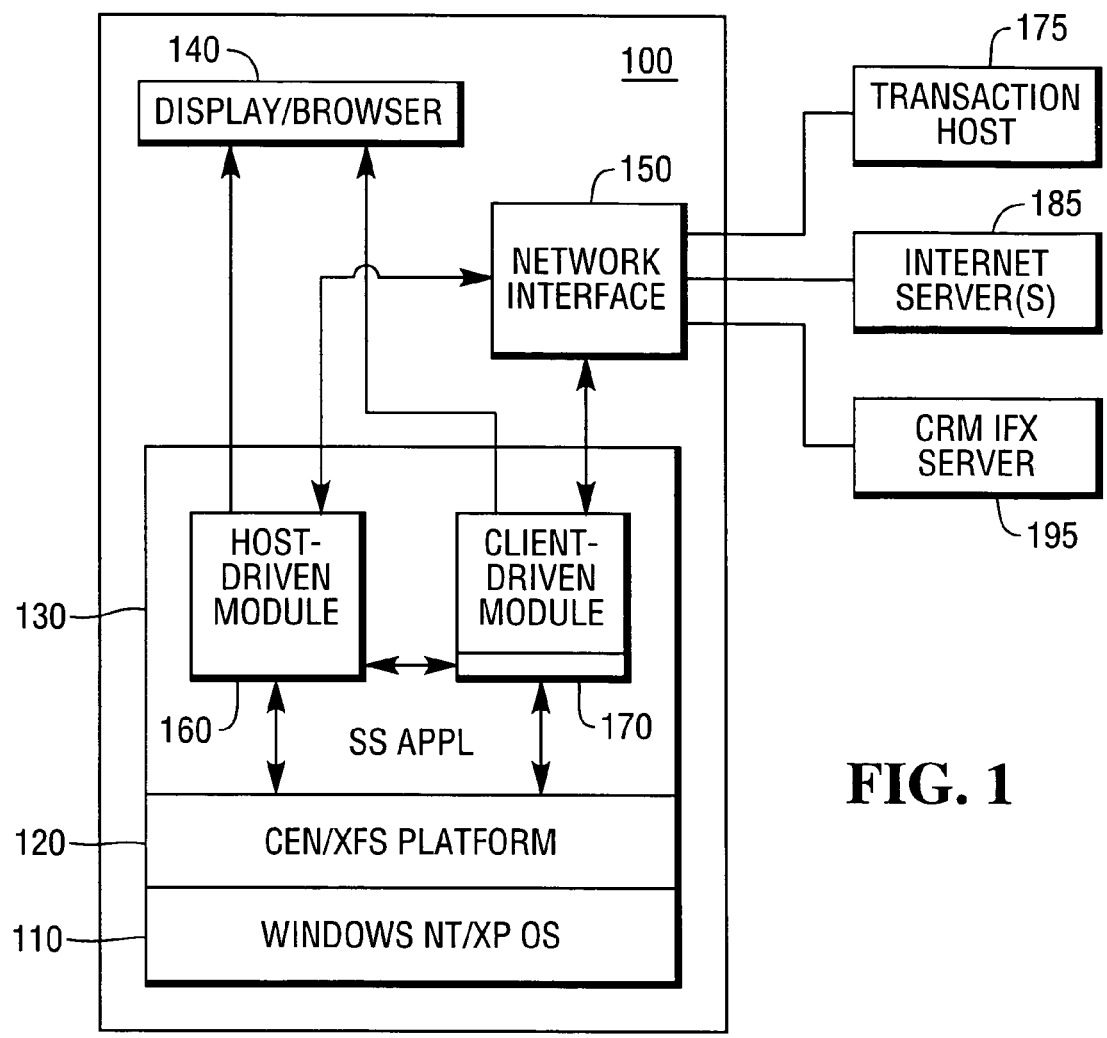
FIG. 1 is a diagram showing a hybrid self-service terminal (SST) that is configured for operation under both the traditional host-driven approach and the client-driven approach.

FIG. 1 shows a hybrid self-service terminal (SST) 100 that is configured for operation under both the host-driven and client-driven approaches described above. The hybrid SST 100 includes a self-service application that is grounded in the host-driven approach, but included among the transaction states through which the SST 100 progresses is a special "Exit" state that, at some point during the transaction flow, allows a client-driven application module to take control of the SST 100.

The hybrid SST 100 is typically built upon a traditional architecture that is common for financial-services SSTs. In the example of FIG. 1, the hybrid SST 100 is built upon a layered architecture in which a Microsoft Windows NT or XP operating system (OS) 110 supports a transaction platform 120 that follows the Extensions for Financial Services (XFS) interface standard, in particular the XFS standard as put forth by the European Committee for Standardization (CEN), known as "CEN/XFS." A self-service application 130 sits on top of the CEN/XFS platform 120 and controls interaction between the hybrid SST 100 and users of the SST, primarily through a video display/browser 140 that appears on a monitor within the SST. The self-service application 130 also controls interaction between the hybrid SST 100 and a transaction host 175 in a financial-transaction network, as well as interaction with web-based servers, such as traditional Internet servers 185 and a customer-relationship management (CRM) server 195 that allows, e.g., a financial institution to direct targeted marketing or advertising campaigns to the user. Interactions between the hybrid SST 100 and the transaction host 175 and between the SST 100 and the web-based servers 185, 195 are driven by a network-interface module 150 that operates under control of the self-service application 130.

Unlike in traditional SSTs, the self-service application 130 in the hybrid SST 100 is a hybrid application that includes two distinct modules: a "host-driven" module 160 that follows the traditional host-driven approach to financial transactions, and a "client-driven" module 170 that follows the client-driven approach. When the SST operates under control of the host-driven module 160, the SST's interaction with the user, and thus the display screens and input choices made available to the user, are driven by the transaction host 175. When the SST operates under control of the client-driven module 170, the SST's interaction with the user is driven by the self-service application 130 itself and not by the transaction host 175.

In most cases, the client-driven module 170 of the self-service application 130 includes some or all of the software components of a traditional client-driven self-service application. As described below, the functions performed by the client-driven module 170 in the hybrid SST 100 often are no different than the functions performed by traditional client-driven SSTs.

The host-driven module 160, on the other hand, is somewhat different than traditional host-driven self-service applications. While the host-driven module 160 does step through a series of transaction states like a traditional host-driven application does, the host-driven module 160 of the hybrid SST 100 includes a transaction state that does not appear in traditional host-driven applications—an "Exit" state that allows the host-driven module 160 to hand control of the hybrid SST 100 to the client-driven module 170 at some point during a user's interaction with the SST. In most systems as this hand-off occurs, the graphical display that is presented to the user remains consistent in appearance so that the user is unaware of any underlying changes. The "Exit" state and the operation of both the host-driven and client-driven modules are described in more detail below.

Figure 2:
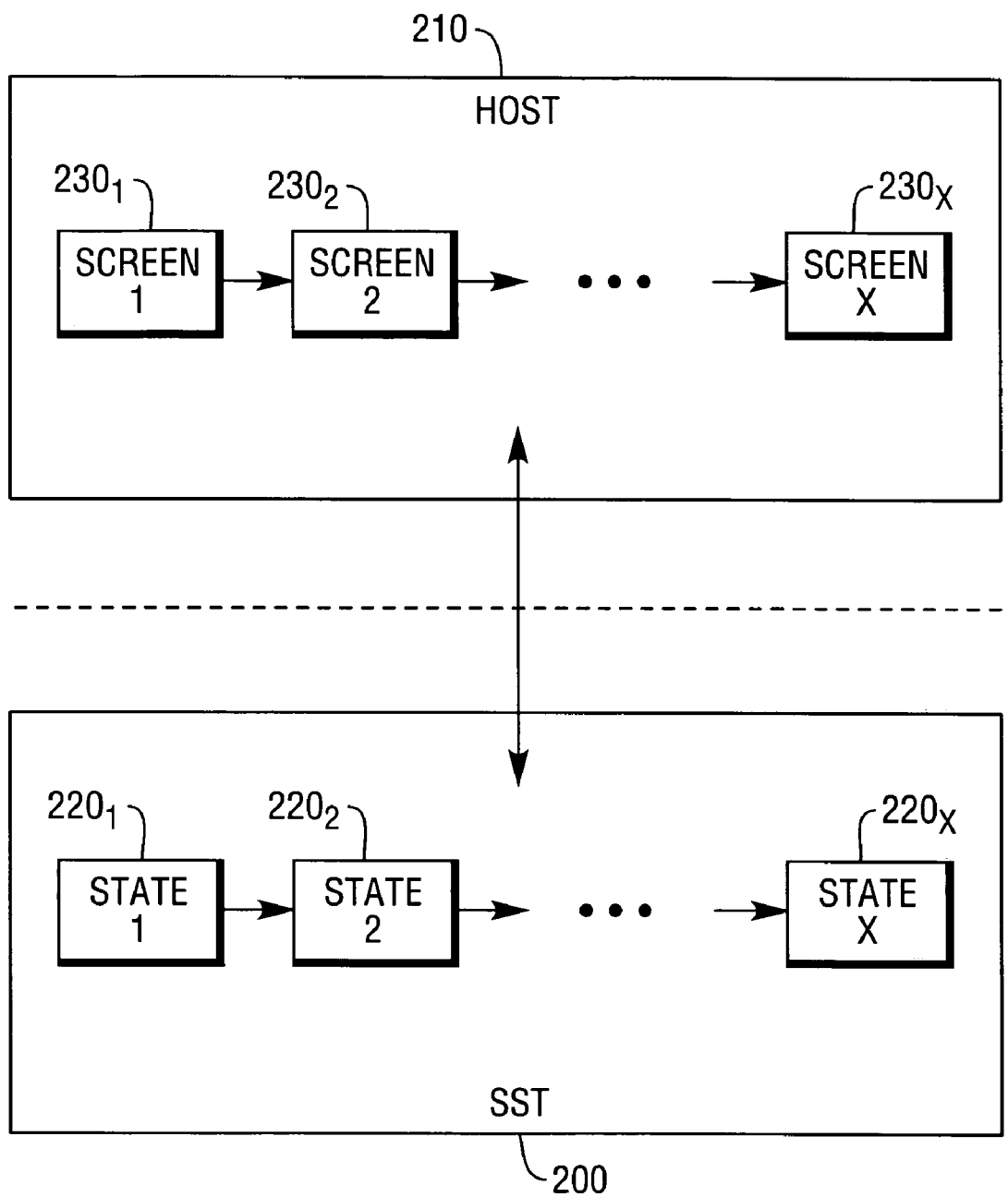
FIG. 2 is a diagram showing interaction between a traditional host-driven SST and a transaction host.

FIG. 2 shows the operation of a standard host-driven SST 200, where the transaction host 210 with which the SST 200 interacts drives the states $220_{1...X}$ through which the SST 200 progresses and drives the video-screen content associated with each state. The state in which the SST 200 resides at any given moment depends upon the user's actions in response to information presented in the screen corresponding to the previous state. In general, the user interacts with the SST 200 through several user-interface modules (e.g., a numbered key pad and multiple soft or hard keys within or adjacent to the video display) that allow the user to make selections from choices presented in the screens displayed on the video monitor.

In the example of FIG. 2, when a user engages the host-driven SST 200, the SST enters an initial state (State 1) $220_1$, for which the transaction host 210 delivers a subsequent video screen (Screen 1) $230_1$. The SST then progress to a subsequent state (State 2) $220_2$, for which the transaction host 210 delivers a corresponding video screen (Screen 2) $230_2$. The host-driven SST 220 and the transaction host 210 continue in this manner until the SST enters a final state (State X) $220_X$ associated with a corresponding final screen (Screen X) $220_X$, at which the SST concludes the user session.

Figure 3:
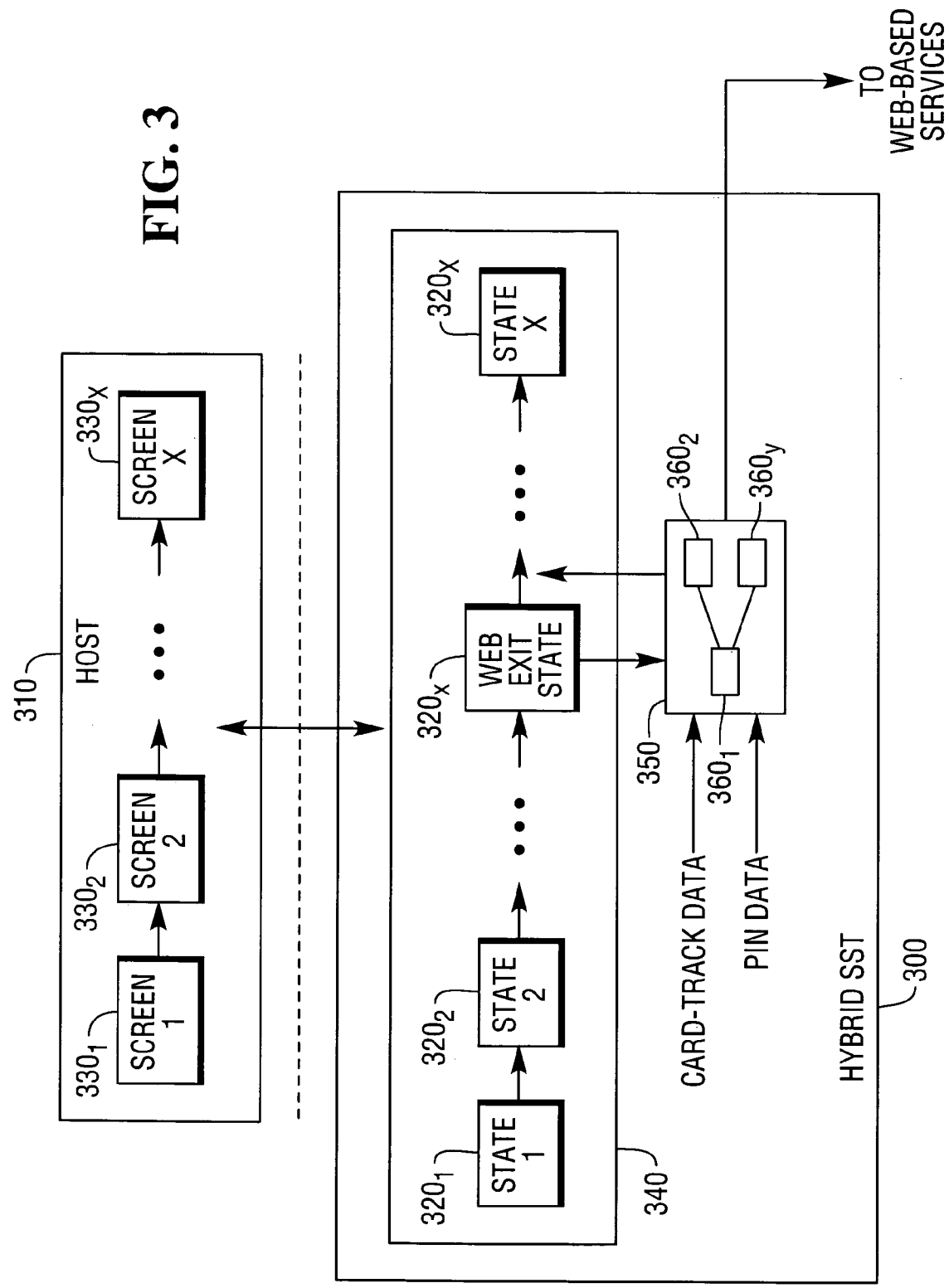
FIG. 3 is a diagram showing interaction between a hybrid SST like that of FIG. 1 and a transaction host.

FIG. 3 shows the operation of a hybrid SST 300 like that shown in FIG. 1 above. Like the standard host-driven SST 200 of FIG. 2, the hybrid SST 300 begins each user session by following the standard host-driven protocol, through which the hybrid SST 300 progresses through a series of transaction states $320_{1...X}$ as a transaction host 310 delivers a corresponding series of video screens $330_{1...X}$.

In the example of FIG. 3, when a user engages the hybrid SST 300, the SST enters an initial state (State 1) $320_1$, for which the transaction host 310 delivers a corresponding video screen (Screen 1) $330_1$. The hybrid SST 300 then progresses to a subsequent state (State 2) $320_2$ for which the transaction host 310 delivers a subsequent video screen (Screen 2) $330_2$, and so on.

At some point during this progression through states, however, the hybrid SST 300 enters a special "Exit" state $320_Z$ for which there is no corresponding video screen in the transaction host 310. Upon entering the "Exit" state, the host-driven module 340 (see item 160 in FIG. 1 above) of the SST's self-service application (130 in FIG. 1 above) hands control of the SST to the client-driven module 350 (see 170 in FIG. 1 above). The client-driven module 350 then begins driving the SST's interaction with the user and thus the content displayed on the SST's video monitor. The client-driven module 350 also begins controlling operation of the SST's network-interface module (170 in FIG. 1 above) and user-interface modules. As described above, this transition from the host-driven module 340 to the client-driven module 350 is meant to be transparent to the user of the SST.

In handing control of the SST over to the client-driven module 350, the host-driven module 340 delivers certain transaction-critical information to the client-driven module 350—information such as card-track data gathered from a user's bank card and PIN data entered into the SST through an encrypted PIN pad. Passing this information between modules allows the client-driven module 350 to work with the transaction host 310 in carrying out some or all of the transactions requested by the user.

In most systems, the client-driven module 350 uses a standard messaging protocol, such as the HTTP/SOAP protocol, and a standard document format, such as HTML or XML format, to drive the SST's interaction with the user. Upon taking control of the hybrid SST 300 from the host-driven module 340, the client-driven module 350 delivers an initial document $360_1$ for display on the video monitor. What the client-driven module 350 does next typically depends on a wide variety of factors, including the user's actions in response to the information presented in the video display, the availability of hardware devices (such as a cash dispenser and a receipt printer) in the SST, and the availability and/or action of the transaction host. In general, the client-driven module 350 next delivers any one of several subsequent documents $360_{2...Y}$ for display on the video monitor to present the user with a new set of information and/or choices. While under control of the client-driven module 350, the hybrid SST 300 receives documents $360_{1...Y}$ from any of a variety of sources, including the Internet or CRM IFX servers described above. In some cases, some or all of the documents originate within the hybrid SST 300 itself (e.g., the documents are stored within the hybrid SST 100).

Once the client-driven module 350 has completed its interaction with the user, it returns control of the hybrid SST 300 to the host-driven module 340. From this point, the hybrid SST 300 continues its progression through the series of state transitions prescribed by the transaction host 310, each leading to the display of a corresponding screen delivered by the host. As with the traditional SST 200 of FIG. 2, the hybrid SST 200 and the transaction host 310 continue in this manner until the hybrid SST 300 reaches its final state (State X) $220_X$ and terminates the user session.

Figure 4:
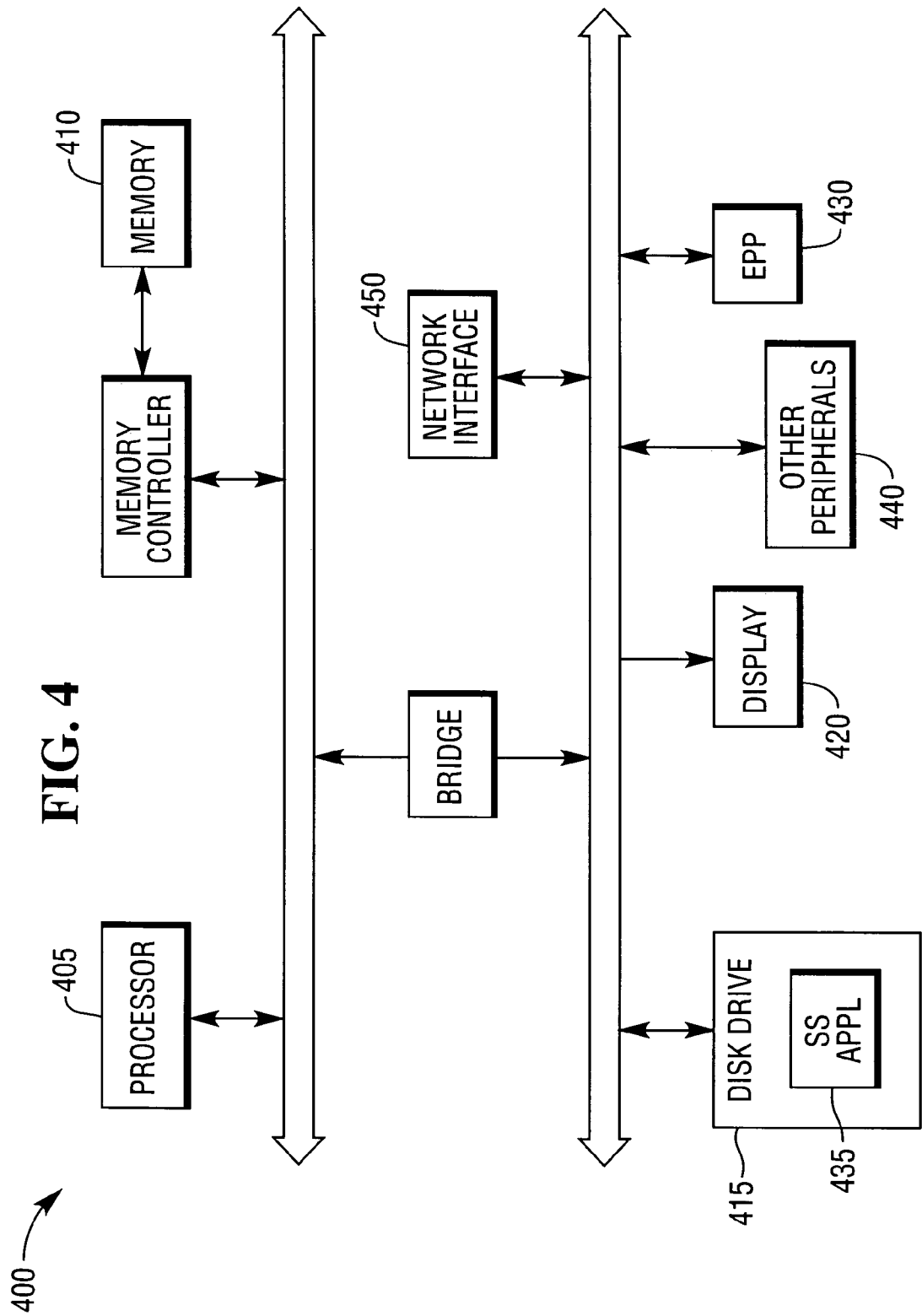
FIG. 4 is a diagram showing the structure of a general-purpose computer system suitable for use in implementing the hybrid SST of FIG. 1.

FIG. 4 shows an example structure of a general-purpose computer system 400 that is suitable for implementing a hybrid self-service terminal like that described above. The computer system 400 includes some or all of the following components: one or more processors 405; one or more temporary data-storage components 410, such as volatile and nonvolatile memory modules; one or more persistent data-storage components 415, such as hard and floppy disk drives, CD-ROM drives, and magnetic tape drives; one or more devices such as a display monitor 420; one or more input devices such as an encrypted PIN pad (EPP) 430; and one or more other peripheral devices 440. The other peripheral devices 440 typically include any of a wide variety of electronic modules commonly found in self-service terminals in the financial-services industry, such as a card reader, a cash dispenser, a cash acceptor, a coin dispenser, a coin acceptor, a check acceptor, and a receipt printer. The computer system 400 also includes a network interface card 450 that allows the terminal to connect, e.g., to the Internet and to a financial-transaction network, which typically includes a local area network (LAN) in a physical branch facility of the financial-services institution, as well as a larger wide area network (WAN) and an ATM switching network.

The SST also includes executable program code, in the form of one or more executable program modules, that is typically stored in one of the persistent storage components 415 and then copied into memory 410 at run-time. In the SST described here, this program code includes a hybrid self-service application 435 like that described above. The processor 405 in the SST executes the program code by retrieving program instructions from memory in a prescribed order and acting on those instructions.

The text above describes one or more specific embodiments of a broader invention. The invention also is carried out in a variety of alternative embodiments and thus is not limited to those described here. Many other embodiments are also within the scope of the following claims.

I claim:

1. A self-service terminal (SST) for use in allowing a user to conduct one or more transactions through a remote transaction host during a user session, the SST comprising:
    a display module for use in presenting information to the user; and
    a processing module configured to:
        cause the SST to progress through a series of states under control of the remote transaction host, each of a plurality of the series of states being associated with display information corresponding to that state;
        for each of the states associated with corresponding display information, receive from the transaction host an instruction to present on the display module a screen containing information corresponding to that state; and
        upon entering a state not associated with corresponding display information:
            halt the progression of the SST through the series of states;
            deliver control of the SST to a client driven module residing on the SST; and
            present on the display module a series of screens containing information received from the client driven module.

2. The SST of claim 1, wherein the processing module is configured, upon a direction from the client driven module, to:
    resume the progression of the SST through the series of states under the control of the remote transaction host; and
    for each of the states associated with corresponding display information, receive from the transaction host an instruction to present on the display module a screen containing information corresponding to the state.

3. The SST of claim 1, wherein the processing module is configured to:
    execute a host driven module in order to cause the SST to progress through the series of states; and
    upon entering a state not associated with display information:
        cease execution of the host driven module; and
        execute the client driven module.

4. The SST of claim 1, wherein the processing module, in receiving instructions from the transaction host, is configured to receive from the transaction host data defining visual content for the screen corresponding to each of the states.

5. The SST of claim 1, wherein the processing module, in presenting on the display module a series of screens containing information received from the client driven module, is configured to process mark-up language documents defining content for each of the screens.

6. A self-service terminal (SST) for use in allowing a user to conduct one or more transactions through a remote transaction host during a user session, the SST comprising:
    a data-storage module that stores a host driven and a client driven modules; and
    a processing module configured to execute the host driven and client driven modules during the user session, such that:
        when the processing module is executing the host driven module, the SST is configured to operate based on instructions from the transaction host prescribing a flow for the user session in the SST; and
        when the processing module is executing the client driven module, the SST is configured to operate under control of the client driven module and to receive no instructions from the transaction host prescribing a flow for the user session in the SST.

7. A method for use in a self-service terminal (SST) in allowing a user to conduct one or more transactions through a remote transaction host during a user session, the method comprising:
    for a first portion of the user session, causing the SST to:
        progress through a series of states under control of the remote transaction host, each of a plurality of the series of states being associated with display information corresponding to that state; and
        for each of the states associated with corresponding display information, receive from the transaction host an instruction to present on the display module a screen containing information corresponding to that state; and
    for a second portion of the user session initiated upon encountering a state not associated with display information, causing the SST to:
        halt progression through the series of states;
        deliver control of the SST to a client driven module residing on the SST; and
        present on the display module a series of screens containing information received from the client driven module.

8. The method of claim 7, further comprising, upon a direction from the client driven module, causing the SST to:
    resume progression through the series of states under the control of the transaction host; and
    for each of the states associated with corresponding display information, receive from the transaction host an instruction to present on the display module a screen containing information corresponding to the state.

9. The method of claim 7, further comprising:
    for the first portion of the user session, executing a host driven module in order to cause the SST to progress through the series of states; and
    for the second portion of the user session:
        ceasing execution of the host driven module; and
        executing the client driven module.

10. The method of claim 7, wherein causing the SST to receive instructions from the transaction host includes causing the SST to receive from the transaction host data defining visual content for the screen corresponding to each of the states.

11. The method of claim 7, wherein causing the SST to present on the display module a series of screens containing information received from the client driven module includes causing the SST to process mark-up language documents defining content for each of the screens.

12. A method for use in a self-service terminal (SST) in allowing a user to conduct one or more transactions through a remote transaction host during a user session, the method comprising:

during a first portion of the user session, executing host driven module that causes the SST to operate under control of the transaction host based on instructions from the transaction host prescribing a flow for the user session in the SST; and during a second portion of the user session, executing a client driven module that causes the SST to operate under control of the client driven module and to receive no instructions from the transaction host prescribing a flow for the user session in the SST.

* * * * *